United States Patent [19]

Kappas

[11] 4,092,946
[45] June 6, 1978

[54] ELECTRIC TROLLING MOTOR HAVING PLANETARY GEAR REDUCTION

[76] Inventor: Chris S. Kappas, 218-13th St., Racine, Wis. 53403

[21] Appl. No.: 818,310

[22] Filed: Jul. 25, 1977

[51] Int. Cl.² .............................................. B63H 5/13
[52] U.S. Cl. .................................... 115/18 E; 74/785
[58] Field of Search ................. 74/785, 786, 787, 788, 74/797, 802; 115/18 E

[56] References Cited

U.S. PATENT DOCUMENTS

| 1,668,709 | 5/1928 | Buehler | 74/797 |
| 4,009,677 | 3/1977 | Croisant | 115/18 E |
| 4,026,167 | 5/1977 | Archer | 74/785 |

*Primary Examiner*—Trygve M. Blix
*Assistant Examiner*—D. W. Keen
*Attorney, Agent, or Firm*—James E. Nilles

[57] ABSTRACT

An electric motor for trolling at slow speeds and the like and comprising an elongated and generally cylindrical submersed unit which houses an electric motor that in turn drives a planetary gear system that in turn drives the propeller. The planetary gear system includes a compact gear assembly which can be assembled ahead of time and quickly inserted in the gear housing. The internal gear ring of the planetary gear system is quickly and easily secured within and to the gear housing only and by means of cap bolts extending through the gear housing and into engagement with the ring gear, the ring gear being preassembled in the gear housing. The motor also includes a bearing support in which are preassembled anti-friction bearing assemblies. A rear sleeve thrust bearing and a front sleeve thrust bearing are located on opposite sides of the gear assembly and act to threadably support the gear assembly and absorb axial thrust.

8 Claims, 3 Drawing Figures

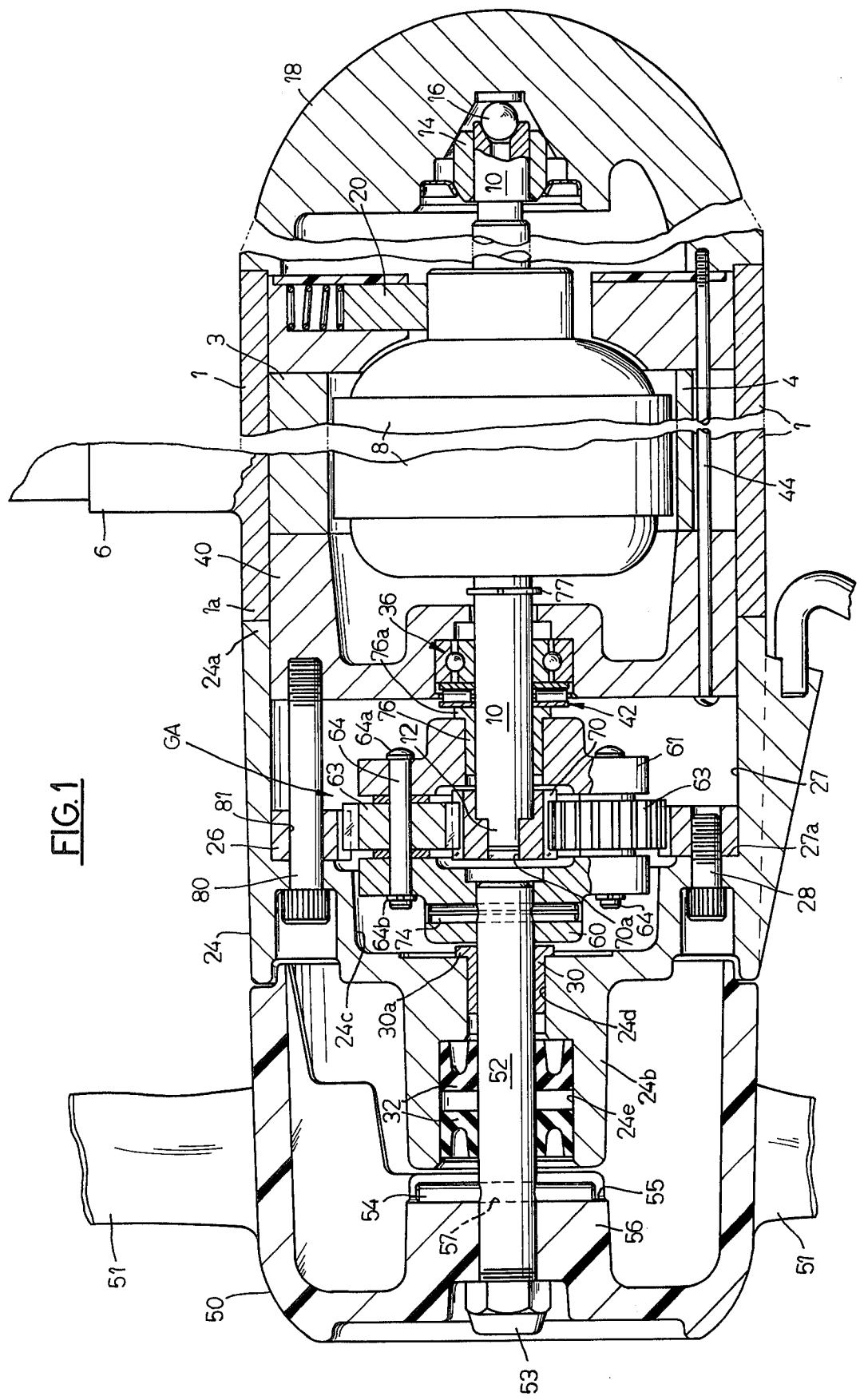

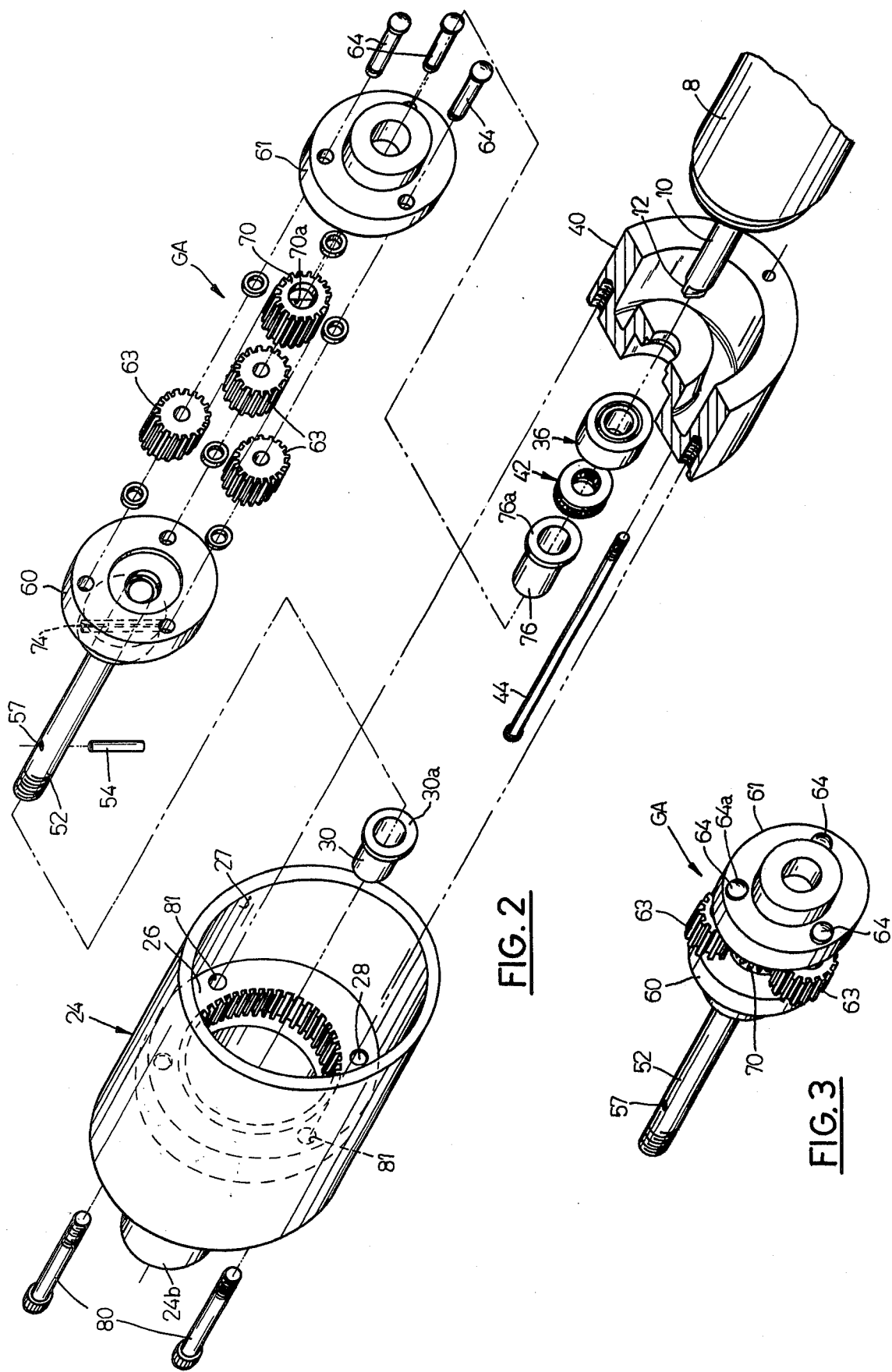

1 …

ELECTRIC TROLLING MOTOR HAVING PLANETARY GEAR REDUCTION

BACKGROUND OF THE INVENTION

The present invention pertains to electric outboard motor assemblies of the type shown generally in my U.S. Pat. No. 3,906,887 issued Sept. 23, 1975 and entitled "Electric Outboard Motor" and more specifically pertains to a planetary gear system for easy and quick connection between the electric motor drive shaft and the propeller drive shaft.

A prior art example of a planetary gear assembly insuch an environment is shown generally in the U.S. Pat. No. 4,009,677 which issued Mar. 1, 1977 and entitled "Radial Thrust Apparatus for High Thrust Trolling Motor".

One difficulty in prior art trolling motors of this particular type lies in the difficulty and complexity of manufacturing and assembling the planetary gear system. In addition, some of these prior art systems required clamping of the internal gear ring between housing parts which further led to complications in the manufacture and assembly and disassembly operations. Furthermore, some of these prior art devices utilizes planetary gears which were suspended in cantilever fashion which contributed to backlash, wear and other problems in transmission of power through the gears, as well as problems in sustained bearing life. Special spherical bearings were required in some prior art devices to attempt to absorb the loads imposed on the transmission.

SUMMARY OF THE PRESENT INVENTION

The present invention provides an electric trolling motor having a planetary gear assembly including a pair of axially spaced planetary gear carriers which support the planetary gears on both their forward and rearward sides, thus eliminating cantilever mounting and providing rugged support for the planetary gears. The gear assembly includes the centrally located sun gear in constant mesh with the planet gears and in one aspect of the invention also includes removable shafts for removably mounting the planetary gears between their carriers. The gear assembly also may have the propeller shaft fixed to the rear carrier and extending therefrom so that the entire gear assembly can then be mounted within a gear housing and then axially slipped into driving engagement with the electric motor drive shaft.

Another aspect of the invention relates to the simple yet rigid mounting of the internal gear ring of the planetary gear system, the ring being mounted within a bore and against a radial shoulder of the gear housing and simply by means of cap bolts which extend through the shoulder and into the ring. In this manner, the gear ring can be easily preassembled in the gear housing prior to the insertion of the planetary gear.

Another aspect of the invention relates to the use of front and rear sleeve thrust bearings, one located on each end of the gear assembly and which thrust bearings rotationally support the gear assembly and also absorb axial thrust thereof in either direction.

These and other objects and advantages of the present invention will appear hereinafter as this disclosure progresses, reference being had to the accompanying drawings.

BRIEF DESCRIPTION OF THE DRAWINGS

FIG. 1 is a longitudinal, sectional view through an electric trolling motor made in accordance with the present invention, certain parts being shown as broken away or removed for the sake of clarity in the drawings;

FIG. 2 is an exploded, perspective view of certain of the parts shown in FIG. 1, but on a reduced scale;

FIG. 3 is a perspective view of the gear assembly unit shown in FIGS. 1 and 2.

DESCRIPTION OF A PREFERRED EMBODIMENT

The electric outboard motor assembly comprises a cylindrical motor housing 1 having a pair of semi-cylindrical permanent magnets 3 and 4 fixed within its internal diameter and intermediate the length of the motor housing. An electric wire conduit 6 extends outwardly from the housing and houses electrical wires, not shown, that lead to an electric motor 8 mounted within the motor housing. A motor drive shaft 10 is driven by the motor in the known manner and extends rearwardly where it terminates in a non-cylindrical drive tang 12. The forward end of the drive shaft 10 is mounted in the sleeve bearing 14 and its end thrusts against the bearing ball 16, the bearing 14 and ball 16 being located in the nose housing 18. The conventional electric brushes 20 are located in the motor housing 1.

The motor assembly also includes a generally cup-shaped gear housing 24 whose cylindrical shape complements that of the motor housing and the front end 24a of the gear housing abuts snugly against the rear end 1a of the motor housing. The gear housing includes a rear hub portion 24b of smaller radial dimension than the gear housing proper and extends rearwardly axially of the gear housing proper. The gear housing 24 also has a central recess 24c which partially houses a rotatably gear assembly GA to be described later in detail.

Fixed within the gear housing 24 is an internal gear ring 26, the gear 26 being fixed within a bore 27 of the gear housing by means of the two cap bolts 28. The outer diameter of the ring 26 is such that it fits within the bore 27 and against the inner transverse shoulder 27a of the housing. Only the cap bolts 28 are required to secure the ring in place and clamping of parts to hold the ring is unnecessary. The gear housing hub 24b has a bore 24d located adjacent the recess 24c and a rear sleeve thrust bearing 30 is pressed into the bore 24d. The thrust bearing 30 has a forward face 30a. The gear housing hub 24b has a larger recess 24e in which is mounted the pair of flexible fluid seals 32.

A bearing support 40 is of such diameter that it fits snugly within and bridges across the rear end of the motor housing 1 and the front end of the gear housing 24. This bearing support 40 has an anti-friction ball bearing assembly 36 mounted therein for rotatably supporting the motor shaft 10. Also mounted within the bearing support is a conventional needle bearing assembly 42 having front and rear races on opposite sides of its needle bearings.

The bearing support 40 is removably fixed within the motor housing 1 by means of the long cap bolts 44 which extend through the bearing housing between the permanent magnets 3 and 4 and are then threadably engaged in the rear end of the nose housing 18, thus also holding the nose portion 18 in assembled relationship with the motor housing and bearing support.

A rotatable propeller hub 50 has a propeller 51 extending radially and integrally therewith, and this propeller hub 50 is mounted on a driven propeller shaft 52 and held captive thereon by an acorn nut 53 threadably engaged on the end of the shaft and also by a shear pin 54 located in diametrically positioned groove 55 in the forward surface of the propeller housing hub 56. The shear pin 54 is conventional and extends through a corresponding hole 57 in the propeller shaft 52 and acts against overload in the known manner. Thus, the propeller hub and its propeller are driven by the shaft 52 which is in turn rotatably supported in the rear sleeve thrust bearing 30. Flexible seals 32 prevent passage of fluid into the gear assembly now to be described.

As shown assembled in FIG. 3, the gear assembly GA includes a planet gear rear carrier 60, a planet gear front carrier 61, between which carriers are rotatably mounted the three circumferentially spaced planet gears 63 rotatable on their respective stub shafts 64, which shafts in turn extend through the rear and front carriers 60 and 61 and are secured therein in any suitable manner, for example by their head 64a and a snap ring 64b at their rear ends. Thus, the shafts 64 and the entire gear assembly GA may be disassembled to repair or replace the gears of the gear assembly. The planetary gears 63 are in constant mesh with the teeth of the internal gear ring 26 and rotate bodily around the gear ring as they are driven in the known manner to be described.

A centrally located sun gear 70 has a non-circular central opening 70a which complements the rear drive tang 12 of the motor drive shaft 10 whereby the sun gear can be slipped over the rear end of the motor drive shaft to form a driving connection therewith. As the motor drive shaft rotates, the sun gear is also rotatably driven and in turn acts to rotate the planet gears 63 about their individual shafts 64 and consequently also bodily rotate or orbit the planet gears in the known manner relative to the internal gear ring 26. The planet gear rear carrier 60 is removably fixed to the front end of the driven propeller shaft 52 by means of pin 74 that extends through both the rear end of the gear carrier and the propeller shaft 52.

It will be noted that planet gear front carrier 61 is mounted on a front sleeve thrust bearing 76 and also abuts against the radially extending flange 76a of the thrust bearing 76. The front end of the thrust bearing 76 abuts against the rear race of the needle bearing assembly 42 and thereby the axial thrust of the propeller is absorbed through the thrust bearing 76, the needle bearing assembly 42, the outer race of the anti-friction ball bearing assembly 36 and by the bearing support 40. When the electric motor is reversed as to its rotational direction, the rearward axial thrust of the propeller is absorbed by the rear sleeve thrust bearing 30. Snap ring 77 on shaft 10 prevents rearward shifting of the motor and its shaft.

The gear assembly shown in FIG. 3 can be completely assembled as a unit including the propeller shaft 52 which is fixed therewith by the pin 74 and also including the sun gear 70 which is located between the three planet gears.

It is noteworthy that the planetary gears 63 are supported at both their front and rear sides by the spaced apart carriers 60, 61 which support both ends of the shafts 64. In this manner there is no cantilever mounting of the planet gears and instead, a particularly strong gear assembly is provided which can be conveniently assembled, as shown in FIG. 3, prior to the assembly of the entire motor. Furthermore, the gear assembly itself can be readily disassembled for maintenance or repair.

It should also be noted that the internal gear ring 26 can be simply pre-assembled within the gear housing 24 by means of the cap bolts 28.

The anti-friction ball bearing assembly 36 and the needle bearing assembly 42 are both mounted in the bearing support 40 prior to assembly of the entire unit.

To assemble the entire outboard motor, the bearing support 40, including its anti-friction bearing assemblies 36 and 42, are inserted over the motor shaft 10 and into the motor housing 1 where the front end of the bearing support abuts against the permanent magnets 3 & 4. The nose housing 18 is then slipped on the front end of the motor shaft 10 and the long bolts 44 are inserted through the bearing support 40, through the motor housing 1, and then are threadably engaged in the nose housing 18. The gear assembly, shown in FIG. 3, is then placed in position by causing the sun gear 70 to be slipped into driving engagement with the gear end of the motor shaft 10 and the planet gear front carrier 61 is assembled around and on the front sleeve thrust bearing 76.

To continue with the assembly procedure, the gear housing 24 is then slipped over the periphery of the bearing support 40 and the internal ring gear 26 slips over and around the planetary gears 63 for driving engagement therewith. Second bolt means in the form of threaded cap bolts 80 are then inserted through the gear housing 24 and extend through suitable apertures 81 in the internal ring gear 26 and the front end of the cap bolts 80 then threadably engage the rear side of bearing support 40. The propeller hub 50 is then slipped on the rear end of the propeller shaft 52, after the shear pin 54 has been located in the shaft 52. The acorn nut 53 is then threadably engaged on the rear end of the propeller shaft to hold the propeller hub in driven engagemenr with the shaft 52.

I claim:

1. An electric trolling motor comprising, a cylindrical motor housing having an electric motor therein and a motor drive shaft extending rearwardly therefrom and terminating in a rear driving end, a cylindrical gear housing located rearwardly and abutting against said motor housing and having a complementary shape therewith, said gear housing having an axial bore therein and a transverse shoulder at the inner end of said bore, an internal gear ring mounted in said bore and abutting against said shoulder and means for removably but rigidly securing said gear ring in said bore and against said shoulder, said gear housing also including a rearwardly extending hub, a rear sleeve thrust bearing mounted centrally in said hub, a propeller shaft rotatably journalled in said rear sleeve thrust bearing and extending through said hub and rearwardly thereof; a bearing support located within said gear housing but axially spaced from said gear ring and extending into said motor housing, means removably securing said bearing support in said motor housing, said bearing support having a central and axially extending aperture therethrough and an anti-friction bearing assembly mounted in said aperture, a sun and planetary gear assembly mounted within said gear housing and comprising, a planet gear rear carrier and a planet gear front carrier axially spaced apart and in coaxial alignment with one another, a plurality of planet gears rotatably mounted between said carriers and in circumferentially spaced relationship therearound, means for rotatably mounting each of said planetary gears between said rear and front carriers, said gear assembly also including a centrally disposed sun gear in constant mesh with said planet gears, said planet gears also being in constant mesh with said internal gear ring, a front sleeve thrust bearing located in said front carrier and in which said motor shaft is journalled, said sun gear and said rear end of said motor shaft forming an axial releasable driving connection therebetween, said front sleeve thrust bearing abutting against said anti-friction bearing assembly, and a propeller shaft having a detachable connection with said rear carrier and extending through said rear sleeve thrust bearing.

2. The trolling motor set forth in claim 1 further characterized in that said means for rotationally mounting said planetary gears include a shaft having a snap ring for easy axial separation of said carriers and complete disassembly of said gear assembly.

3. The trolling motor set forth in claim 2 further characterized in that said bearing support is axially spaced a distance forwardly and separate from said internal gear ring to thereby provide sufficient room for said gear assembly within said gear housing.

4. The trolling motor set forth in claim 1 further characterized in that said bearing support is axially spaced a distance forwardly and separate from said internal gear ring to thereby provide sufficient room for said gear assembly within said gear housing.

5. An electric trolling motor comprising an elongated and generally cylindrical lower unit for housing an electric motor, a gear reduction unit and a propeller, said unit comprising: a cylindrical motor housing having an electric motor therein and a motor drive shaft extending rearwardly therefrom and terminating in a rear driving end, said motor housing having an open rear end; a cylindrical gear housing located rearwardly of said motor housing and having a complementary shape therewith and abutting against said rear end of said motor housing, said gear housing including a bore and a transverse shoulder at the inner end of said bore, an internal gear ring mounted in said bore and abutting against said shoulder and means extending through said shoulder and threadably engaged in said ring for removably but rigidly securing said ring in said bore and against said shoulder, said gear housing also including a rearwardly extending hub, a rear sleeve thrust bearing mounted centrally in said hub, a propeller shaft rotatably journalled in said rear sleeve thrust bearing and extending through said hub and rearwardly thereof and terminating in a rear threaded end; a bearing support located within said bore of said gear housing and extending into said rear end of said motor housing, bolt means removably securing said bearing support in said motor housing, said bearing support having a central and axially extending aperture therethrough, an anti-friction ball bearing assembly mounted in said aperture, and an anti-friction needle bearing assembly mounted in said aperture and abutting against said ball bearing assembly; a sun and planetary gear assembly mounted within said gear housing and comprising, a planet gear rear carrier and a planet gear front carrier axially spaced apart and in coaxial alignment with one another, a plurality of planet gears rotatably mounted between said carriers and in circumferentially spaced relationship therearound, shaft means for each of said planetary gears and extending through said rear and front carriers, said gear assembly also including a centrally disposed sun gear in constant mesh with said planet gears, said plant gears also being in constant mesh with said internal gear ring, a front sleeve thrust bearing located in said front carrier and in which said motor shaft is journalled, said front sleeve thrust bearing abutting against said anti-friction needle bearing assembly, a propeller shaft having a detachable connection with said rear carrier and extending through said rear sleeve thrust bearing, a propeller hub detachably secured on the rear end of said propeller shaft, said sun gear and said rear end of said motor shaft forming an axial releasable driving connection therebetween, whereby said electric motor through its drive shaft acts to rotationally drive said gear assembly and consequently said propeller shaft and propeller hub, and the axial forward thrust of a propeller on said propeller hub is absorbed through said gear assembly, said front sleeve thrust bearing and said anti-friction bearing assembly in said bearing support.

6. An electric trolling motor comprising an elongated and generally cylindrical lower unit for housing an electric motor, a gear reduction unit and a propeller, said unit comprising: a cylindrical motor housing having an electric motor therein and a motor drive shaft extending rearwardly therefrom and terminating in a rear driving end, said motor housing having a front end and open rear end; a nose housing secured to said front end of said motor housing, a cylindrical gear housing located rearwardly of said motor housing and having a complementary shape therewith and abutting against said rear end of said motor housing, said gear housing including a bore and a transverse shoulder at the inner end of said bore, an internal gear ring mounted in said bore and abutting against said shoulder and means extending through said shoulder and threadably engaged in said ring for removably but rigidly securing said ring in said bore and against said shoulder, said gearing housing also including a rearwardly extending hub, a rear sleeve thrust bearing mounted centrally in said hub, a propeller shaft rotatably journalled in said rear sleeve thrust bearing and extending through said hub and rearwardly thereof and terminating in a rear threaded end; a bearing support located within said bore of said gear housing and extending into said rear end of said motor housing, said bearing support being axially separated from said gear ring, bolt means extending through said bearing support and said motor housing and threadably engaged in said nose housing for removably securing said bearing support, said motor housing and said nose housing together; second bolt means for removably securing said gear housing to said bearing support; said bearing support having a central and axially extending aperture therethrough, an anti-friction ball bearing assembly mounted in said aperture, and an anti-friction needle bearing assembly mounted in said aperture and abutting against said ball bearing assembly; a sun and planetary gear assembly mounted within said housing and comprising, a planet gear rear carrier and a planet gear front carrier axially spaced apart and in coaxial alignment with one another, a plurality of planet gears rotatably mounted between said carriers and in circumferentially spaced relationship therearound, a shaft for each of said planetary gears and extending through said rear and front carriers for supporting said planetary gears at each side thereof, each shaft having a removable snap ring to permit ready separation of said carriers, said gear assembly also including a centrally disposed sun gear in constant mesh with said planet gears, said planet gears also being in constant mesh with said internal gear ring, a front sleeve thrust bearing located in said front carrier and in which said motor shaft is journalled, said front sleeve thrust bearing abutting against said anti-friction needle bearing assembly, a propeller shaft having a detachable connection with said rear carrier and extending through said rear sleeve thrust bearing, a propeller hub detachably secured on the rear end of said propeller shaft, said sun gear and said rear end of said motor shaft forming an axial releasable driving connection therebetween, whereby said electric motor through its drive shaft acts to rotationally drive said gear assembly and consequently said propeller shaft and propeller hub, and the axial forward thrust of a propeller on said propeller hub is absorbed through said gear assembly, said front sleeve thrust bearing and said anti-friction bearing assembly in said bearing support.

7. A sun and planetary gear assembly for an electric trolling motor having a gear housing, said gear assembly mountable within said gear housing and comprising, a planet gear rear carrier and a planet gear front carrier axially spaced apart and in coaxial alignment with one another, a plurality of planet gears rotatably mounted between said carriers and in circumferentially spaced relationship therearound, a shaft for each of said planetary gears and extending through said rear and front carriers for supporting said planetary gears at each side thereof, a snap ring for removably securing said shaft in said carriers, said gear assembly also including a centrally disposed sun gear in constant mesh with said planet gears, said sun gear having a drive shaft receiving opening located centrally therein, a front sleeve thrust bearing located in said front carrier, and a propeller shaft having a detachable connection with said rear carrier and extending therefrom.

8. The gear assembly set forth in claim 7 in a combination with a gear housing to provide a sub-assembly for said electric trolling motor, said gear housing being of cylindrical shape and having a bore therein and also having a radial flange located at the inner end of said bore, an internal gear ring removably fixed to said flange, said gear housing also having a central and rearwardly extending hub, a rear sleeve thrust bearing mounted centrally in said hub for rotatably supporting said propeller shaft therein, said planetary gears of said gear assembly being in constant mesh with said internal gear ring.

* * * * *